United States Patent
Mangin

(10) Patent No.: US 9,712,424 B2
(45) Date of Patent: Jul. 18, 2017

(54) METHOD FOR CONFIGURING NODE DEVICES OF A MESH COMMUNICATIONS NETWORK, COMPUTER PROGRAM, INFORMATION STORAGE MEANS AND SYSTEM

(71) Applicant: MITSUBISHI ELECTRIC CORPORATION, Tokyo (JP)

(72) Inventor: Christophe Mangin, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 14/763,318

(22) PCT Filed: Feb. 19, 2014

(86) PCT No.: PCT/JP2014/054593
§ 371 (c)(1),
(2) Date: Jul. 24, 2015

(87) PCT Pub. No.: WO2014/156439
PCT Pub. Date: Oct. 2, 2014

(65) Prior Publication Data
US 2016/0014015 A1 Jan. 14, 2016

(30) Foreign Application Priority Data
Mar. 28, 2013 (EP) .................................. 13161662

(51) Int. Cl.
*H04L 12/707* (2013.01)
*H04L 12/759* (2013.01)
(Continued)

(52) U.S. Cl.
CPC ............ *H04L 45/028* (2013.01); *H04L 45/12* (2013.01); *H04L 45/22* (2013.01); *H04L 45/28* (2013.01);
(Continued)

(58) Field of Classification Search
CPC ........................... H04L 49/351; H04L 49/557
See application file for complete search history.

(56) References Cited

U.S. PATENT DOCUMENTS 6,324,162 B1 * 11/2001 Chaudhuri ............. H04B 1/745
                                                            340/2.9
7,426,179 B1 *  9/2008 Harshavardhana ..... H04J 3/085
                                                            370/219

(Continued)

OTHER PUBLICATIONS

International Search Report, issued in PCT/JP2014/054593, dated May 27, 2014.
(Continued)

*Primary Examiner* — Edan Orgad
*Assistant Examiner* — Saumit Shah
(74) *Attorney, Agent, or Firm* — Birch, Stewart, Kolasch & Birch, LLP

(57) ABSTRACT

Node devices of a mesh communications network are interconnected by links. Forwarding tables are initially built following a link-state routing protocol. Each node device performs, upon detecting a link failure or a link recovery, determining and transmitting. Each end-point, when receiving said message(s) representative of said link failure or said link recovery, records an indication of whether each data path identified in the received message(s) can be activated or not. When the received message(s) is(are) representative of a link failure, each end-point performs selecting and transmitting.

10 Claims, 6 Drawing Sheets

Figures 1A, 1B:
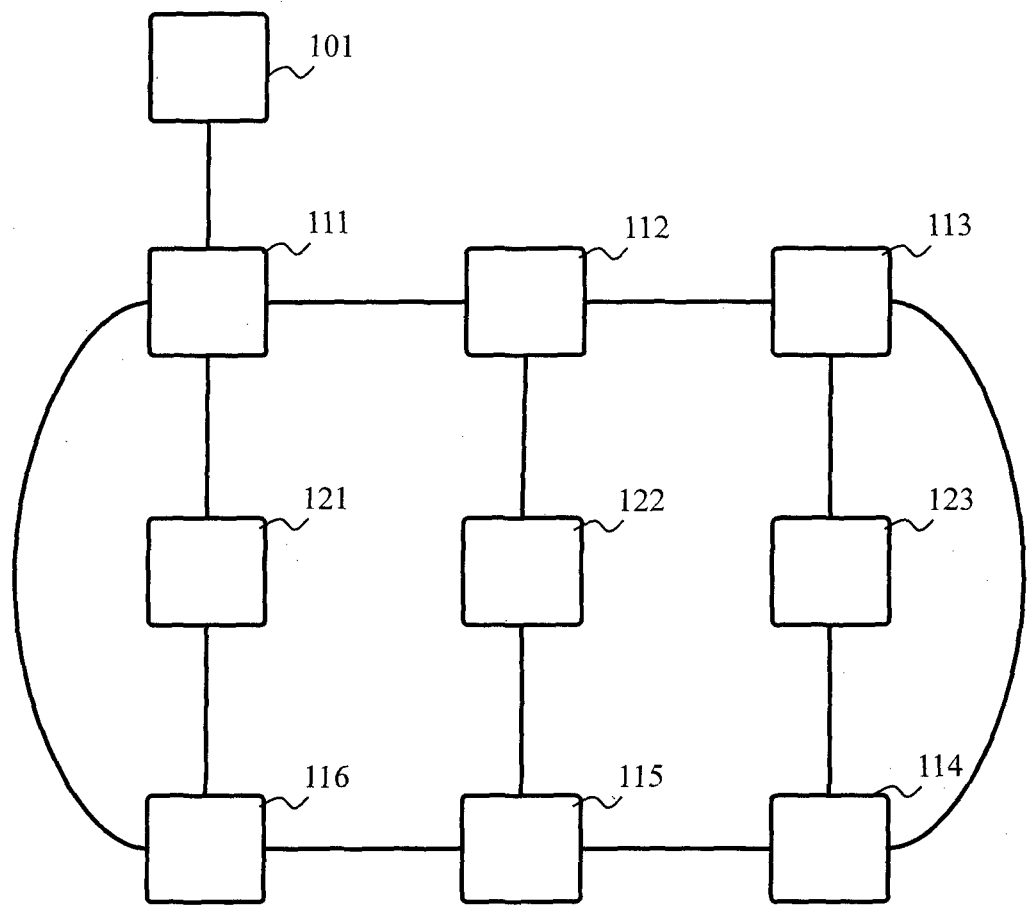

(51) Int. Cl.
*H04L 12/703* (2013.01)
*H04L 12/721* (2013.01)
*H04L 12/741* (2013.01)
*H04L 12/931* (2013.01)
*H04L 12/939* (2013.01)
*H04L 12/751* (2013.01)

(52) U.S. Cl.
CPC .......... *H04L 45/745* (2013.01); *H04L 49/351* (2013.01); *H04L 49/557* (2013.01); *H04L 45/02* (2013.01)

(56) References Cited

U.S. PATENT DOCUMENTS

| | | | | | |
|---|---|---|---|---|---|
| 7,688,756 | B2* | 3/2010 | Allan | ................... | H04L 12/462 370/254 |
| 7,693,047 | B2* | 4/2010 | Guichard | ................ | H04L 45/02 370/217 |
| 2010/0080120 | A1* | 4/2010 | Bejerano | ................. | H04L 12/18 370/228 |
| 2010/0271936 | A1* | 10/2010 | Allan | .................... | H04L 12/462 370/225 |
| 2010/0315943 | A1* | 12/2010 | Chao | ....................... | H04L 12/26 370/221 |
| 2013/0064073 | A1 | 3/2013 | Cheng et al. | | |

OTHER PUBLICATIONS

Pinheiro et al. "MTRP: Multi-Topology Recovery Protocol", ICN 2013: The Tweifth International Conference on Networks. Jan. 27, 2013, pp. 197-203.

Written Opinion of the International Searching Authority, issued in PCT/JP2014/054593, dated May 27, 2014.

Xi et al. "IP Fast Rerouting for Single-Link/Node Failure Recovery", Broadband Communications, Networks and Systems, 2007. Broadnets 2007. Sep. 10, 2007, pp. 142-151.

* cited by examiner

METHOD FOR CONFIGURING NODE DEVICES OF A MESH COMMUNICATIONS NETWORK, COMPUTER PROGRAM, INFORMATION STORAGE MEANS AND SYSTEM

The present invention generally relates to configuring node devices of a mesh communications network, said node devices being interconnected by links, when detecting a link failure or a link recovery.

In order to enable setting up communications in a mesh communications network, the node devices implement a link-state routing protocol, which leads to each node device building a forwarding table. The forwarding tables contain information for allowing the node devices to determine, when receiving a message or a data packet including information about the addressee, to which output port of the node device the message or data packet has to be forwarded. The forwarding table is sometimes referred to as filtering table.

Link-state routing protocols are widely used in communications network, in order to automatically propagate and synchronize network topology information in the mesh communications network. One can for instance cite the link-state routing protocol SPB (Short Path Bridging), as detailed in the standard IEEE 802.1aq. SPB enables implementing logical Ethernet networks on top of native Ethernet infrastructures using a link-state type of routing protocol in order to advertise both topology and logical network membership. Other link-state routing protocols exist to achieve the same goals as SPB. However, such link-state routing protocols are so generic that they involve a great amount of message exchanges and a significant latency to converge toward synchronized forwarding tables.

It is desirable to overcome the aforementioned problems of the state of the art.

In particular, it is desirable to provide a solution that avoids re-computing the forwarding tables from scratch each time a topology change occurs in the mesh communications network, therefore simplifying the propagation of the topology change information.

It is furthermore desirable to provide a solution that is easy-to-implement and that is cost-effective.

To that end, the present invention concerns a method for configuring node devices of a mesh communications network, the node devices being interconnected by links, forwarding tables implemented by said node devices being initially built following a link-state routing protocol. The method is such that each node device performs, upon detecting a link failure of a link previously connected to a port of said node device or a link recovery of a link connected to a port of said node device: determining, from a local forwarding table, one or more data paths impacted by the link failure or restored by the link recovery; and, transmitting toward one end-point of each determined data path at least one message representative of said link failure or said link recovery and including identifiers of said determined paths. The method is further such that each end-point, when receiving said message(s) representative of said link failure or said link recovery, records an indication of whether each data path identified in the received message(s) can be activated or not. The method is further such that, when the received message(s) is(are) representative of a link failure, each end-point performs: selecting an alternative data path for each data path identified in said received message(s); and transmitting, for each selected alternative data path, a path switch message toward the other end-point of said selected alternative data path, aiming at activating said alternative data path instead of the corresponding data path impacted by the link failure.

Thus, by propagating the message representative of the link failure or of the link recovery to an end-point of the concerned data path, re-computing of the forwarding tables is avoided and the propagation of the topology change information is simplified.

According to a particular feature, each forwarding table consists of a correspondence between: a data path identifier; an identifier of an end-point of said data path; an identifier of an output port of the node device implementing said forwarding table, via which the identified end-point of said data path is reachable; and a flag indicating whether the identified path can be activated.

Thus, the forwarding table can be easily obtained from link-state routing protocol, such as SPB and enhanced by the addition of said flag.

According to a particular feature, each node device further performs, upon detecting a link failure of a link previously connected to a port of said node device or a link recovery of a link connected to a port of said node device: indicating, in the local forwarding table, that said determined paths cannot be activated, in case of link failure; and indicating, in the local forwarding table, that said determined paths can be activated, in case of link recovery.

Thus, said node device is able to perform appropriate filtering when receiving data expected to be propagated via the concerned data path.

According to a particular feature, each node device performs, upon detecting the link failure or the link recovery: determining via which port of said node device the link that failed was connected or the link that recovered is connected; indicating, in the message representative of the link failure or of the link recovery, an identifier of a data path via which the message representative of the link failure or of the link recovery has to be propagated; and transmitting the message representative of the link failure or of the link recovery via all ports of said node device but the determined port via which the link that failed was connected or the link that recovered is connected. The method is further such that, when receiving the message representative of the link failure or of the link recovery, each node device performs: checking whether the data path via which the message representative of the link failure or of the link recovery has to be propagated is present in a local forwarding table; transmitting the message representative of the link failure or of the link recovery via all ports of said node device but the port from which said message has been received, when said data path is present in a local forwarding table; and discarding the message representative of the link failure or of the link recovery, when said data path is not present in a local forwarding table.

Thus, the propagation of the message representative of the link failure or of the link recovery is easy to implement, although the forwarding tables do not contain information to address the end-point to which the message representative of the link failure or of the link recovery has to be propagated.

According to a particular feature, when receiving the path switch message, each device of the mesh communications network maintains information indicating which data path, for which said device is an end-point, is activated.

According to a particular feature, once each forwarding table is built following the link-state routing protocol, each node device performs: providing to at least one neighbour node device the content of each forwarding table implemented by said node device and related to the port of said node device via which said neighbour node device is connected to said node device; obtaining from each neighbour node device the content of each forwarding table implemented by said neighbour node device and related to the port of said neighbour node device via which said node device is connected to said neighbour node device; and building at least one reverse path table from said content obtained from each neighbour node.

Thus, information to address the end-point to which the message representative of the link failure or of the link recovery has to be propagated can be easily obtained.

According to a particular feature, when generating the message representative of the link failure of the link recovery, each node device determines the end-point to which said message has to be transmitted using said reverse path table.

Thus, the propagation of the message representative of the link failure or of the link recovery is simplified.

According to a particular feature, the mesh communications network comprises an input node device, all data paths defined in each forwarding table have said input node device as end-point, and, when generating the message representative of the link failure or of the link recovery, each node device transmits the message representative of the link failure or of the link recovery to said input node device.

Thus, topology changes related to link failure of link recovery are managed in a simplified manner, in a context in which uplink and downlink communications are setup with devices of the mesh communications network via the input node device.

According to a particular feature, the mesh communications network enables devices located in a train to communicate, at least some node devices are located in the train, and the link-state protocol is applied by the node devices when there is a train configuration change.

Thus, the link-state protocol is applied when a major topology change occurs, implying re-computing from scratch the forwarding tables.

According to a particular feature, the mesh communications network is of Ethernet type and the link-state routing protocol is the Shortest Path Bridging SPB protocol.

The present invention also concerns a system comprising node devices and data path end-points of a mesh communications network, the node devices being interconnected by links, the node devices comprising forwarding tables that are initially built following a link-state routing protocol. The system is such that each node device implements, upon detecting a link failure of a link previously connected to a port of said node device or a link recovery of a link connected to a port of said node device: means for determining, from a local forwarding table, one or more data paths impacted by the link failure or restored by the link recovery; and, means for transmitting toward one end-point of each determined data path at least one message representative of said link failure or said link recovery and including identifiers of said determined paths. The system is further such that each end-point, when receiving said message(s) representative of said link failure or said link recovery, implements means for recording an indication of whether each data path identified in the received message(s) can be activated or not, and, when the received message(s) is(are) representative of a link failure, each end-point implements: means for selecting an alternative data path for each data path identified in said received message(s); and means for transmitting, for each selected alternative data path, a path switch message toward the other end-point of said selected alternative data path, aiming at activating said alternative data path instead of the corresponding data path impacted by the link failure.

The present invention also concerns a computer program that can be downloaded from a communication network and/or stored on a medium that can be read by a computer and run by a processor. This computer program comprises instructions for implementing the aforementioned method in any one of its embodiments, when said program is run by the processor. The present invention also concerns information storage means, storing such a computer program.

Since the features and advantages related to the system and to the computer program are identical to those already mentioned with regard to the corresponding aforementioned method, they are not repeated here.

Figure 2:
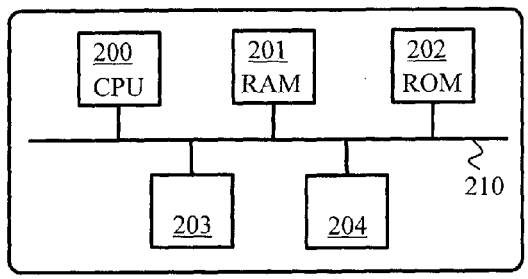
Figure 3:
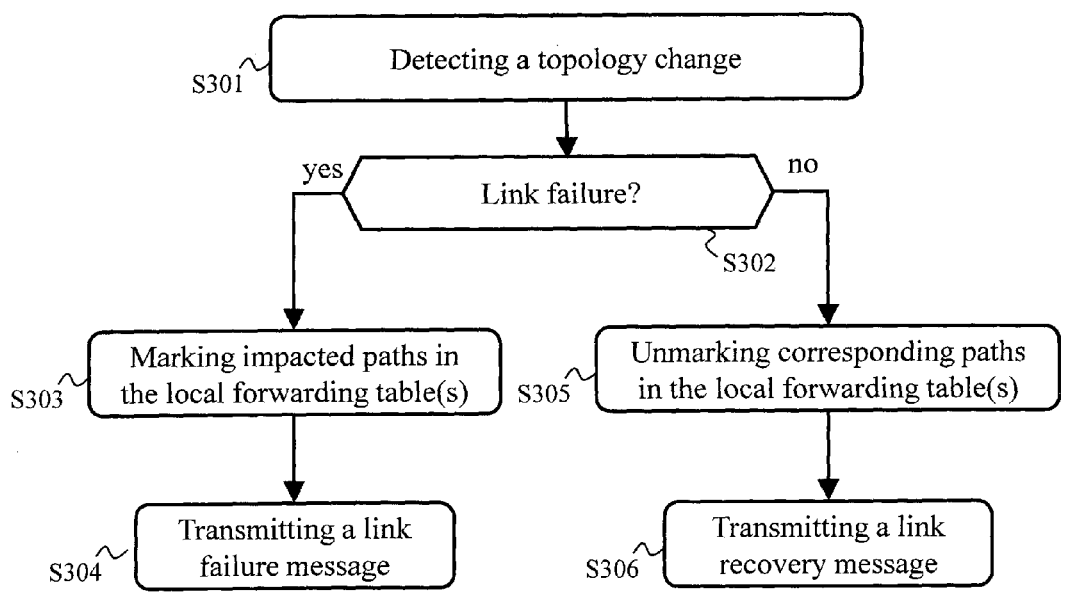
Figure 4A:
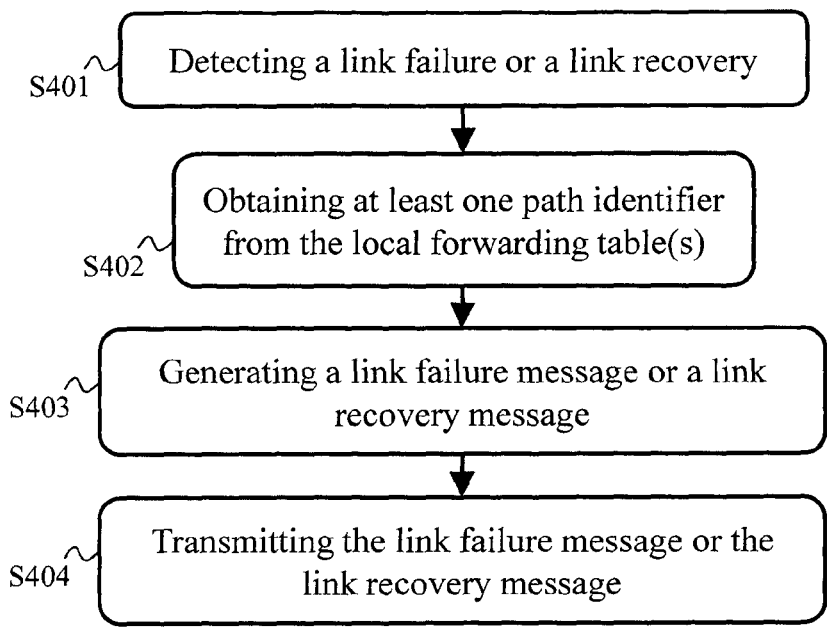
Figure 4B:
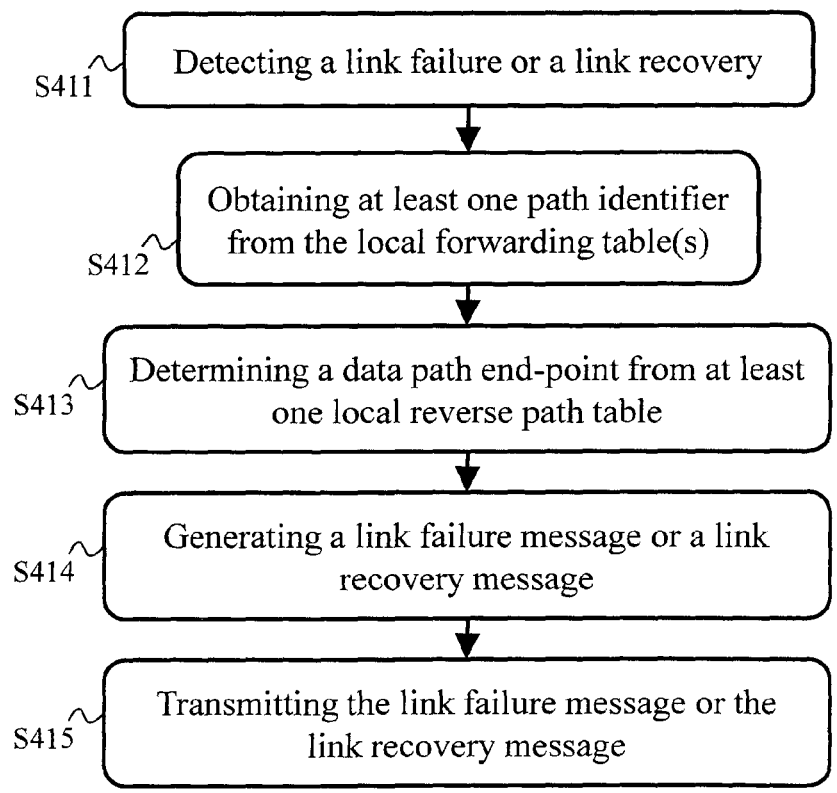
Figure 4C:
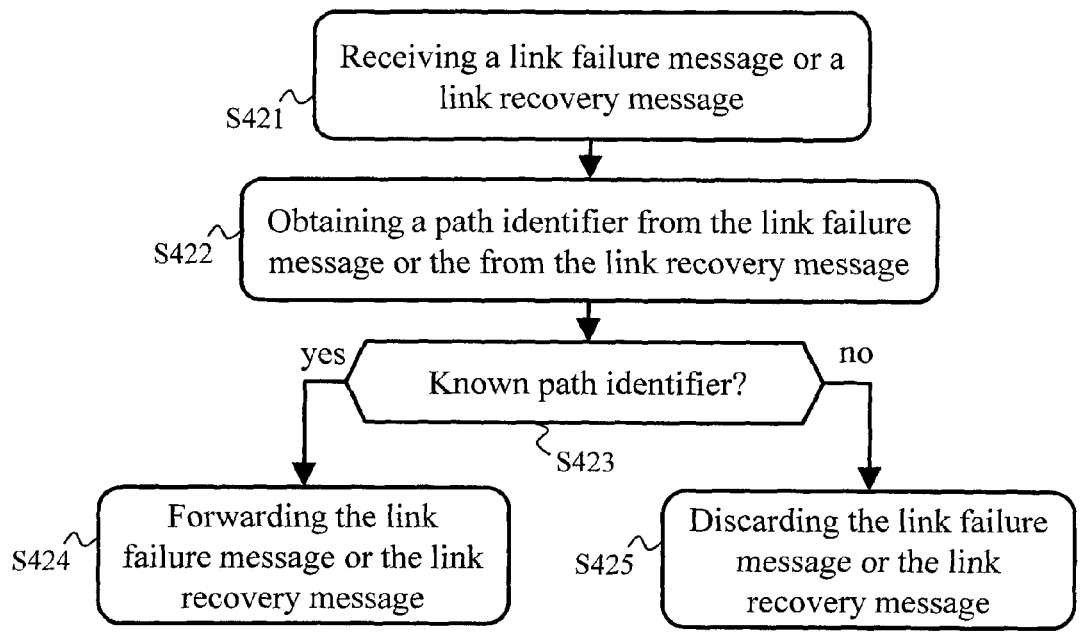
Figure 4D:
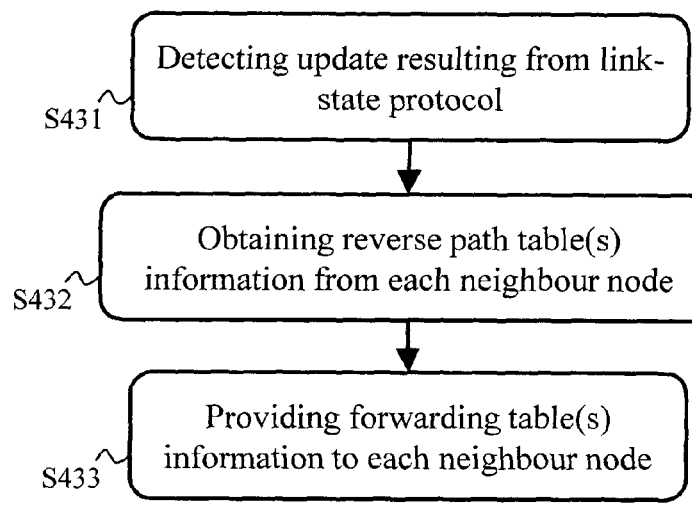
Figures 4E, 5:
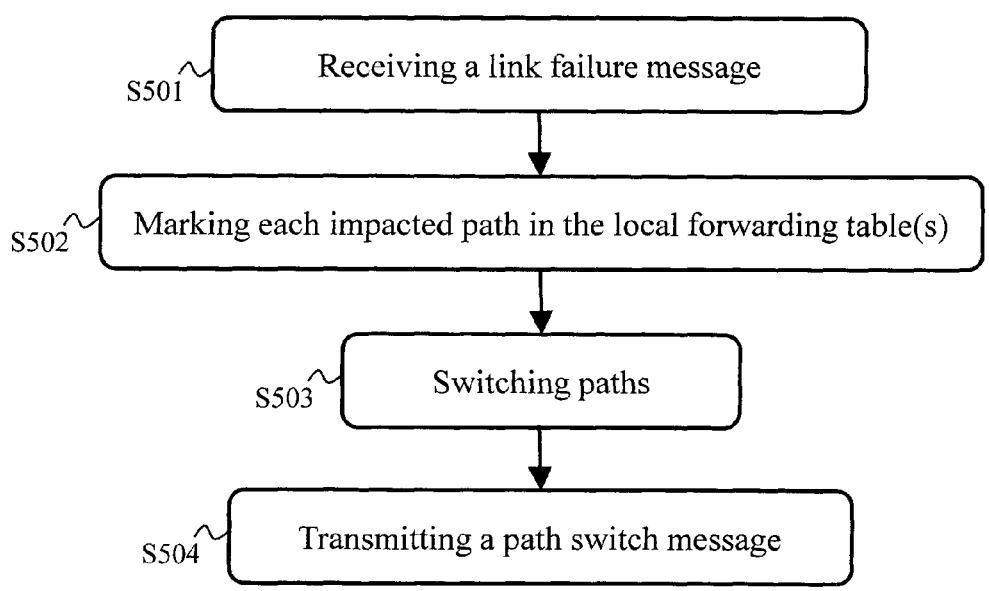
Figure 6:
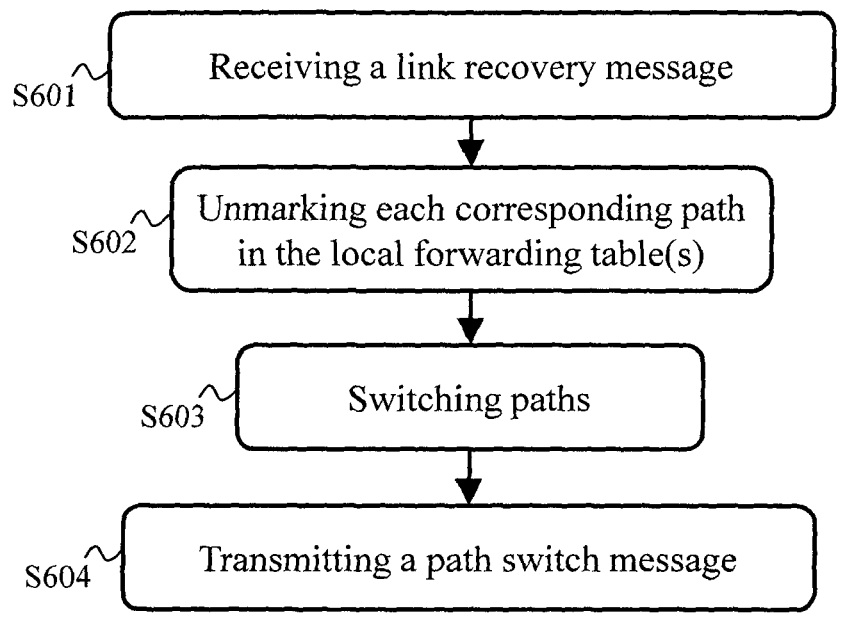
Figure 7:
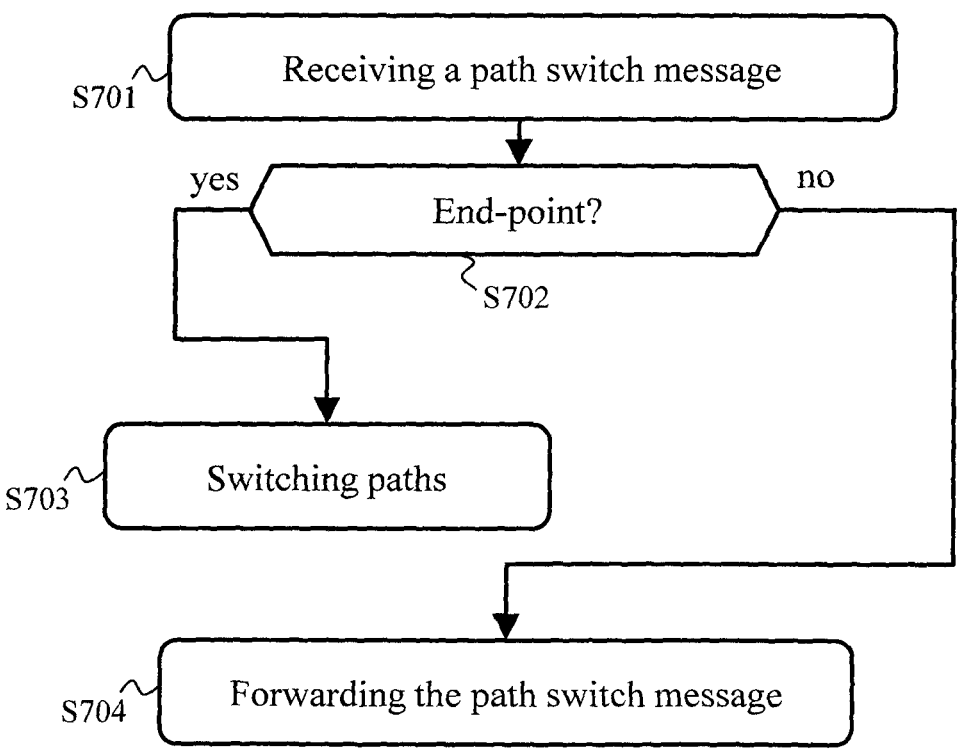

The characteristics of the invention will emerge more clearly from a reading of the following description of an example of embodiment, said description being produced with reference to the accompanying drawings, among which:

FIG. 1A schematically represents a mesh communications network in which the present invention may be implemented;

FIG. 1B schematically represents a forwarding table implemented by a node device of the mesh communications network;

FIG. 2 schematically represents an architecture of the node device;

FIG. 3 schematically represents an algorithm, performed by the node device, when detecting a change of topology of the mesh communications network;

FIG. 4A schematically represents a first algorithm, performed by the node device, when generating a link failure message or a link recovery message;

FIG. 4B schematically represents a second algorithm, performed by the node device, when generating a link failure message or a link recovery message;

FIG. 4C schematically represents an algorithm, performed by the node device, when receiving a link failure message or a link recovery message;

FIG. 4D schematically represents an algorithm, performed by the node device, for creating at least one local reverse path table;

FIG. 4E schematically represents a reverse path table optionally implemented by a node device;

FIG. 5 schematically represents an algorithm, performed by an input node device of the mesh communications network, when receiving the link failure message;

FIG. 6 schematically represents an algorithm, performed by the input node device, when receiving the link recovery message;

FIG. 7 schematically represents an algorithm, performed by the node device or a terminal device of the mesh communications network, when receiving a path switch message.

FIG. 1A schematically represents a mesh communications network in which the present invention may be implemented. The mesh communications network is preferably of Ethernet type.

The mesh communications network shown in FIG. 1A comprises, when said mesh communications network is fully in operation, a ring part consisting of plural node devices 111, 112, 113, 114, 115, 116 interconnected via respective links. The links connecting each node device 111, 112, 113, 114, 115, 116 to adjacent node devices of the ring part may be wired or wireless. Two node devices interconnected by a link are called herein neighbour node devices.

The mesh communications network shown in FIG. 1A further comprises at least one input node device 101. The input node device 101 allows interconnecting the mesh communications network to another communications network, such as for instance a core network or another type of backbone network. When the mesh communications network is a stand-alone network, the input node device 101 may be omitted.

In a preferred embodiment, the input node device 101 is a node device that is one end-point of each data path defined in the mesh communications network. For instance, the input node device 101 interconnects the mesh communications network to a core network and allows uplink and downlink communications with the node devices 111, 112, 113, 114, 115, 116, or with terminal devices 121, 122, 123, of the mesh communications network. Uplink communications refer to data transmissions toward the core network for which one device of the mesh communications network is the originator. Downlink communications refer to data transmissions from the core network for which at least one device of the mesh communications network is the recipient.

The mesh communications network shown in FIG. 1A further comprises at least one terminal device 121, 122, 123. Each terminal device is, when said mesh communications network is fully in operation, connected to at least two node devices of the ring part via respective links. Each terminal device is, when the mesh communications network is fully in operation, preferably connected to two node devices of the ring part via respective links. The links connecting each terminal device 121, 122, 123 to the respective node devices of the ring part may be wired or wireless.

It is considered that the mesh communications network is fully in operation when all links are operational.

In order to enable setting up communications in the mesh communications network, the node devices implement a link-state routing protocol, which leads to each node device building a forwarding table. According to link-state routing protocol principles, every node device constructs a map of the connectivity to the mesh communications network, in the form of a graph, showing which node devices are connected to which other node devices. Each node device then independently computes the best data paths from each node device to every possible destination node device in the mesh communications network. The node device then stores a collection of best data paths in one or more aforementioned forwarding table. In other words, the link-state routing protocol leads to the node devices building from scratch the forwarding tables.

In a preferred embodiment, the node devices of the mesh communications network implement the link-state routing protocol SPB. Implementing SPB is therefore particularly advantageous when the mesh communications network is connected to a core network, or another type of backbone network, via the input node device 101.

The link-state routing protocol allows reconfiguring the whole mesh communications network in order to take into account major topology changes. However, a simplified advertising of the topology change can be applied, when a link, active and taken into account when building the forwarding tables, fails or is restored.

Indeed, when the link-state routing protocol ends, the forwarding table(s) are representative of a certain network topology. The link-state routing protocol is launched again when a reconfiguration of the network is required, which rebuilds from scratch the forwarding tables, and the simplified advertising is performed when a link fails or is restored.

According to an illustrative example, the mesh communications network shown in FIG. 1A corresponds to a communications network enabling communications to/from a train. The input node 101 enables communication devices embedded in train consist to get access to another consist or a core network. The node devices 111, 116 are embedded in a first car of the consist, and aim at providing communications resiliency to the terminal device 121 also embedded in said first car; the node devices 112, 115 are embedded in a second car of the consist, and aim at providing communications resiliency to the terminal device 122 also embedded in said second car; the node devices 113, 114 are embedded in a third car of the consist, and aim at providing communications resilience to the terminal device 123 also embedded in said third car. When a link between said node devices fails, or is restored, the simplified advertising approach is implemented, as detailed hereinafter. However, when a new consist or train configuration shall be applied (adding new consists or cars in a consist, removing cars in a consist or consists), then the link-state routing protocol is implemented in order to build forwarding tables in accordance with the new train configuration. In other words, the mesh communications network enables devices located in a train to communicate, at least some node devices are located in the train, and the link-state protocol is applied by the node devices when there is a train configuration change.

FIG. 1B schematically represents the forwarding table implemented by each node device 111, 112, 113, 114, 115, 116. The forwarding table comprises information representative of data paths throughout the mesh communications network. Each row of the forwarding table represents a data path.

The forwarding table shown in FIG. 1B comprises a first column 151 storing, for each row, an address of a first end-point EP1 of the data path. The forwarding table further comprises a second column 152 identifying, for each row, via which port of the node device the first end-point EP1 is reachable throughout the data path. The forwarding table further comprises a third column 153 storing, for each row, an identifier of the concerned data path.

The forwarding table further comprises a fourth column 154 storing a flag indicating whether the data path can be activated or not. After having performed the network discovery phase of the aforementioned link-state routing protocol, each node device sets the flag to TRUE for each data path identified in the forwarding table, thus indicating that said data path can be activated. This flag is modified by the node device when a link failure or a link recovery is detected, as detailed hereafter.

The first 151, second 152 and third 153 columns of the forwarding table are filled with values resulting from the network discovery phase of the link-state routing protocol. The forwarding table is then enhanced by addition of the fourth column 154.

In the context of the mesh communications network shown in FIG. 1A, each end-point of a data path is either the input node 101, a node device or a terminal device. Preferably, one of the end-points of each data path is the input node device 101. This is the case for instance when the input node 101 is adapted to interconnect the part of the mesh communications network shown in FIG. 1A to a core or backbone network, or another type of backbone network, via which all data communications are supposed to be setup. When one of the end-points of each data path is the input node device 101, only the other end-point of each data path is indicated in the forwarding table shown in FIG. 1B, namely in the first column 151.

In the context of a node device implementing such a forwarding table, said forwarding table is said local.

When a message is received by a node device, said node device obtains, from the received message, a data path identifier, as well as an identifier of the concerned data path end-point. The node device further obtains an indication of the input port of said node device from which the message has been received. Then, the node device parses the forwarding table to find out a row for which the third column 153 contains the obtained data path identifier and for which the first column 151 contains the obtained end-point identifier. When the node device finds such a row and when the port indicated in the second column 152 of said row is different from the input port, the node device uses the port indicated in the second column 152 of said row as output port to forward the message. When the node device finds such a row and when the port indicated in the second column 152 of said row is identical to the input port, the node device uses all other ports as output ports to forward the received message. When the node device does not find such a row, the node device discards the received message.

FIG. 2 schematically represents an architecture of the node devices of the ring part of the mesh communications network and/or of the input node device and/or of an end-point of a data path across the mesh communications network. Generally speaking, the architecture refers to a node device.

According to the shown architecture, the node device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard Disk Drive) 203, or any other device adapted to read information stored on storage means; and, a set 204 of communication interfaces, which allows communicating with neighbour node devices via respective links.

CPU 200 is capable of executing instructions loaded into RAM 201 from ROM 202, from an external memory such as an SD (Secure Digital) card, or from HDD 203. After the node device has been powered on, CPU 200 is capable of reading instructions from RAM 201 and executing these instructions. The instructions form one computer program that causes CPU 200 to perform some or all of the steps of at least one of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm, performed by each node device of the mesh communications network, when detecting a link failure or a link recovery in the mesh communications network. Let's consider that the algorithm is executed by the node device 112.

When the node device 112 starts executing the algorithm of FIG. 3, each local forwarding table has been filled in, in accordance with the outcome of the link-state routing protocol.

In a step S301, the node device 112 detects that a link attached to one of its ports becomes temporarily unavailable or that a link attached to one of its ports recovers from a temporary unavailability.

In the step S302, the node device 112 starts the simplified advertising of the topology change. The node device 112 checks whether the topology change concerns a link recovery or a link failure. When the topology change concerns a link failure, a step S303 is performed; otherwise, a step S305 is performed.

In the step S303, the node device 112 optionally marks, in the local forwarding table(s), the data paths impacted by the link failure. In other words, the node device 112 indicates, for each data path impacted by the link failure, that said data path cannot currently be activated. Considering the forwarding table shown in FIG. 1B, the node device 112 sets, for each data path impacted by the link failure, the flag in the fourth column 154 to FALSE.

The node device 112 is able to identify the port to which the concerned link was previously connected. From the identification of the port, by parsing the local forwarding table(s), the local node device 112 is able to determine the data paths impacted by the link failure. Referring to the forwarding table shown in FIG. 1B, said data paths are identified in the third column 153 for each row in which the identified port is present in the second column 152.

In a following step S304, the node device 112 generates a link failure message. The link failure message includes an identifier of each data path identified by the node device 112 as being impacted by the link failure, as well as an identifier of each data path end-point to which the link failure message is addressed. Referring to the forwarding table shown in FIG. 1B, the node device 112 includes in the link failure message each data path for which the node device 112 has set the flag in the fourth column 154 to FALSE in the step S303. In a variant, the node device 112 may generate, and further transmit, a plurality of link failure messages for a single detected link failure. In this case, each data path impacted by the link failure is identified at least once in the plurality of link failure messages.

Then, the node device 112 transmits the generated link failure message(s) toward one end-point of each data path identified in the link failure message(s). Each end-point(s) to which the link failure message(s) is(are) transmitted is such that the node device 112 is preferably located between said end-point and said link concerned by the link failure on the concerned data path.

Referring to the forwarding table shown in FIG. 1B, the node device 112 may not be able to identify said end-point from the local forwarding table(s). Either, the node device to which the generated link failure message(s) shall be transmitted is known by each node device of the mesh communications network, e.g. all link failure messages to be transmitted to the input node device 101, or the node device 112 needs to collect information from neighbour node devices, as detailed hereafter with regard to FIGS. 4B and 4D.

Once the step S304 is performed, the algorithm ends.

In the step S305, the node device 112 optionally unmarks, in the local forwarding table(s), the data paths concerned by the link recovery. In other words, the node device 112 indicates, for each data path concerned by the link recovery, that said data path has been restored. Considering the forwarding table shown in FIG. 1B, the node device 112 sets, for each restored data path, the flag in the fourth column 154 to TRUE. The step S305 is expected to be performed upon link recovery detection, when the step S303 is expected to be performed upon link failure detection.

The node device 112 is able to identify the port to which the concerned link is reconnected. From the identification of the port, by parsing the local forwarding table(s), the node device 112 is able to determine the data paths impacted by the link recovery. Referring to the forwarding table shown in FIG. 1B, said data paths are identified in the third column 153 for each row in which the identified port is present in the second column 152.

In a following step S306, the node device 112 generates a link recovery message. The link recovery message includes an identifier of each data path identified by the node device 112 as being restored by the link recovery. Referring to the forwarding table shown in FIG. 1B, the node device 112 includes in the link recovery message each data path for which the node device 112 has set the flag in the fourth column 154 to TRUE in the step S305. In a variant, the node device 112 may generate, and further transmit, a plurality of link recovery messages for a single detected link recovery. In this case, each data path restored by the link recovery is identified at least once in the plurality of link recovery messages.

As already mentioned, in the preferred embodiment, the input node 101 is an end-point of all data paths listed in the local forwarding table. All link recovery messages are then propagated toward the input node 101.

Then, the node device 112 transmits the generated link failure message(s) to one end-point of each data path identified in the link recovery message(s). Each end-point(s) to which the link recovery message(s) is(are) transmitted is such that the node device 112 is preferably located between said end-point and said link concerned by the link recovery on the concerned data path. the node device 112 is not able to identify said end-point from the local forwarding table(s). Either, the node device to which the generated link recovery message(s) shall be transmitted is known by each node device of the mesh communications network, e.g. all link recovery messages to be transmitted to the input node device 101, or the node device 112 needs to collect information from neighbour node devices, as detailed hereafter with regard to FIGS. 4B and D.

Once the step S306 is performed, the algorithm ends.

In a preferred embodiment, the link failure and the link recovery messages are in the form of OAM (Operations, Administration and Management) messages.

FIG. 4A schematically represents a first algorithm, performed by each node device of the mesh communications network, when generating the link failure message or the link recovery message. Let's consider that the algorithm is executed by the node device 111.

In a step S401, the node device 111 detects a link failure or a link recovery on one port of the node device 111.

In a following step S402, the node device 111 obtains at least one data path identifier from the local forwarding table(s), each said data path identifier identifying a respective data path impacted by the link failure or the link recovery, i.e. a data path no more usable in case of link failure and a data path again usable in case of link recovery. In view of the forwarding table shown in FIG. 1B, the node device 111 parses the forwarding table and identifies each row in which the second column 152 contains an identifier of the port via which the link failure or the link recovery has been detected. The data path identifiers obtained in the step S402 are the identifiers stored in the third column 153 of the identified rows. When a link failure is detected, the node device 111 locally inactivates each data path concerned by the link failure. In view of the forwarding table shown in FIG. 1B, the node device 111 sets the flag of the fourth column 154 to FALSE in each identified row. When a link recovery is detected, the node device 111 locally reactivates each data path concerned by the link recovery. In view of the forwarding table shown in FIG. 1B, the node device 111 sets the flag of the fourth column 154 to TRUE in each identified row.

In a following step S403, the node device 111 generates a link failure message when a link failure has been detected in the step S401 and generates a link recovery message when a link recovery has been detected in the step S401. In view of the forwarding table shown in FIG. 1B, the node device 111 retrieves the identifier stored in the first column 151 for each row concerning a data path impacted by the link failure or the link recovery. For each data path identified in the step S402, the node device 111 further obtains from the local forwarding tables(s) an identifier of the concerned end-point of said data path. The link failure message and the link recovery message therefore contains the identifier of each impacted data path in association with said data path identifier. The algorithm of FIG. 4A is particularly adapted to the case where any link failure or recovery message has to be propagated toward the input node device 101.

In a following step S404, the node device 111 transmits the generated link failure or link recovery message to all ports of the node device 111 but the one via which the link failure or the link recovery has been detected, i.e. the port to which is reconnected (link recovery) or was connected (link failure) the link having been recovered or having failed. When a neighbour node device receives such a link failure or link recovery message, said neighbour node processes the received link failure or link recovery message as detailed hereafter with regard to FIG. 4C.

FIG. 4B schematically represents a second algorithm, performed by each node device of the mesh communications network, when generating the link failure message or the link recovery message. Let's consider that the algorithm is executed by the node device 111. The algorithm of FIG. 4B is alternative to the algorithm of FIG. 4A.

In a step S411, the node device 111 detects a link failure or a link recovery on one port of the node device 111.

In a following step S412, the node device 111 obtains at least one data path identifier from the local forwarding table(s), each said data path identifier identifying a respective data path impacted by the link failure or the link recovery, i.e. a data path no more usable in case of link failure and a data path again usable in case of link recovery. In view of the forwarding table shown in FIG. 1B, the node device 111 parses the forwarding table and identifies each row in which the second column 152 contains an identifier of the port via which the link failure or the link recovery has been detected. The data path identifiers obtained in the step S402 are the identifiers stored in the third column 153 of the identified rows. When a link failure is detected, the node device 111 locally inactivates each data path concerned by the link failure. In view of the forwarding table shown in FIG. 1B, the node device 111 sets the flag of the fourth column 154 to FALSE in each identified row. When a link recovery is detected, the node device 111 locally reactivates each data path concerned by the link recovery. In view of the forwarding table shown in FIG. 1B, the node device 111 sets the flag of the fourth column 154 to TRUE in each identified row.

In a following step S413, the node device 111 searches for the identified data path in a local reverse path table associated to the port of the node device 111 via which the link failure or the link recovery has been detected. The creation of the local reverse path table(s) is detailed hereafter with regard to FIG. 4D. Thanks to the data path identifier, the node device 111 obtains, from the local reverse path table associated to the port of the node device 111 via which the link failure or the link recovery has been detected, an identifier of the data path end-point to which the link failure or the link recovery has to be transmitted.

In a following step S414, the node device 111 generates a link failure message when a link failure has been detected in the step S401 and generates a link recovery message when a link recovery has been detected in the step S401. The algorithm of FIG. 4B is particularly adapted to the case where the link failure or the recovery message has to be propagated toward a node device that is not mandatorily the input node device 101. The generated link failure or link recovery message includes the end-point identifier obtained in the step S413. When receiving the link failure or the link recovery message, the addressed node device knows that said message is intended to said node device thanks to the addressee identifier included in said link failure or link recovery message.

In a following step S404, the node device 111 transmits the generated link failure or link recovery message to all ports of the node device 111 but the one via which the link failure or the link recovery has been detected, i.e. the port to which is reconnected (link recovery) or was connected (link failure) the link having been recovered or having failed. When a neighbour node device receives such a link failure or link recovery message, said neighbour node processes the received a link failure or link recovery message as detailed hereafter with regard to FIG. 4C.

FIG. 4C schematically represents an algorithm, performed by each node device of the mesh communications network, when receiving the link failure message or the link recovery message. Let's consider that the algorithm is executed by the node device 111.

In a step S421, the node device 111 receives a link failure message or a link recovery message.

In a following step S422, the node device 111 identifies, from the received link failure message or from the received link recovery message, the data path via which the link failure message or the link recovery message has to be propagated, and also identifies the end-point identifier associated with said data path identifier.

In a following step S423, the node device 111 checks whether the couple formed by the identifier of the data path and the identifier of the end-point, both identified in the step S422, is known by the node device 111, i.e. whether the data path identifier obtained from the received link failure or link recovery message concerns a data path crossing the node device 111. In view of the forwarding table shown in FIG. 1B, the node device 111 checks whether the obtained data path identifier is present in the third column 153 of the forwarding table and the end-point identifier in the first column 151 of the forwarding table.

When the data path identifier is known by the node device 111, a step S424 is performed; otherwise, a step S425 is performed.

In the step S424, when the port from which the link failure message or the link recovery message has been received is the same as the one indicated in the second column 152 of the forwarding table, the node device 111 forwards the link failure message or the link recovery message via all ports of the node device 111 but the port from which the link failure message or the link recovery message has been received by the node device 111. When the port from which the link failure message or the link recovery message has been received is not the same as the one indicated in the second column 152 of the forwarding table, the node device 111 forwards the link failure message or the link recovery message via the port indicated in the second column 152 of the forwarding table.

In the step S425, which means that the node device 111 is not on the data path through which the link failure message or the link recovery message has to be propagated, the node device 111 discards the link failure message or the link recovery message.

FIG. 4D schematically represents an optional algorithm, performed by each node device of the mesh communications network, for creating a local reverse path table. Let's consider that the algorithm is executed by the node device 111. The algorithm of FIG. 4D is useful when the node devices of the mesh communications network implement the algorithm of FIG. 4B when detecting a link failure or a link recovery.

In a step S431, the node device 111 detects an update resulting from the aforementioned link-state routing protocol. In other words, each local forwarding table has been re-computed from scratch following a major topology change.

In a following step S432, the node device 111 obtains reverse path table information from each neighbour node device. The node device 111 determines each port of said node device 111 to which a link exists with a neighbour node device. Then the node device 111 transmits a reverse path information request to each said neighbour node device. In response to the reverse path information requests, the node device 111 receives a list of data path identifiers associated with end-point identifiers. From the information received by each neighbouring node, the node device 111 creates a reverse path table associated with the port of the node device 111 to which said neighbour node device is connected. The created reverse path table therefore contains a correspondence between data path identifiers and end-point identifiers. An example of reverse path table is detailed hereafter with regard to FIG. 4E.

In a following step S433, the node device 111 provides forwarding table information to the neighbour node devices of said node device 111. The principle is the same as for S432, except that the roles undertaken by the node devices are inverted. Therefore, in the step S433, the node device 111 receives reverse path information requests from the neighbour node devices of the node device 111. For each reverse path information request, the node device 111 determines the port via which said reverse path information request is received, i.e. determines the port via which the corresponding neighbour node device is connected. Then, the node device 111 parses the local forwarding table(s) to determine which data paths, identified in the local forwarding table(s), go through said port. Referring to the forwarding table shown in FIG. 1B, the node device 111 identifies each row for which the second column 152 indicates said port. The data path identifier stored in the third column 153 and the data path end-point identifier stored in the first column 151 of the identified rows are then collected and provided in response to the reverse path information request.

It has to be noted that the steps S432 and S433 may be inverted or performed in parallel.

FIG. 4E schematically represents an example of reverse path table, as optionally implemented by the node devices of the mesh communications network.

The reverse path table shown in FIG. 4E comprises a first column 441 storing, for each row, an address of a second end-point EP2 of the data path, the first end-point EP1 being stored in one local forwarding table of the considered node device. The reverse path table further comprises a second column 442 storing, for each row, an identifier of the concerned data path.

Each reverse path table is associated with a port of the considered node device. In a variant, a single reverse path table is created and further comprises a third column in which an identifier of the concerned port is stored for each row of the reverse path table.

FIG. 5 schematically represents an algorithm, performed by the input node device 101, when receiving the link failure message. In the preferred embodiment, the algorithm of FIG. 5 is performed by the input node device 101. In a more general context, the algorithm of FIG. 5 is performed by the end-point to which the link failure message is addressed.

In a step S501, the input node device 101 receives the link failure message. The received link failure message includes an identifier of at least one data path impacted by the link failure and for which the input node device 101 is an end-point. As already mentioned, the input node device 101 may receive more than one link failure message for each link failure.

In a following step S502, the input node device 101 marks, in the local forwarding table(s), the data paths impacted by the link failure. In other words, the input node device 101 indicates, for each data path impacted by the link failure, that said data path cannot currently be activated. Considering the forwarding table shown in FIG. 1B, the input node device 101 sets, for each data path impacted by the link failure, the flag in the fourth column 154 to FALSE.

In a following step S503, the input node device 101 checks, for each data path impacted by the link failure, whether said data path was so far activated for transmitting data and/or messages to the concerned node device or terminal device. Indeed, plural data paths may exist between two end-points, but only one or few of them may be effectively activated for transmitting data and/or messages. The input node device 101, or more generally the end-point receiving the link failure message, maintains information identifying each activated data path. When the link failure message concerns a data path effectively activated so far, the input node device 101 selects an alternative data path to replace said data path. The input node device 101 then switches from the previously active data path, which underwent the link failure, to the selected alternative data path. Selecting the alternative data path may be arbitrarily performed, or be performed according to a predefined criteria, such as a load balancing criteria. Selecting the alternative data path is performed among the data paths that can be activated. It means that, referring to the forwarding table shown in FIG. 1B, the input node device 101 selects the alternative data path among the data paths for which the flag of the fourth column 154 is set to TRUE.

In a following step S504, the input node device 101 generates a path switch message. The path switch message includes an identifier of the other end-point of the data path that underwent the link failure and an identifier of the selected alternative data path. Then, the input node device 101 transmits the generated path switch message via the selected alternative data path. The output port of the input node device 101 via which the path switch message has to be transmitted can be retrieved from the local forwarding table(s), as the alternative data path is present in the local forwarding table(s).

FIG. 6 schematically represents an algorithm, performed by the input node device 101, when receiving the link recovery message. In the preferred embodiment, the algorithm of FIG. 6 is performed by the input node device 101. In a more general context, the algorithm of FIG. 6 is performed by the end-point to which the link recovery message is addressed.

In a step S601, the input node device 101 receives a link recovery message. The received link recovery message includes an identifier of each data path restored by the link recovery and for which the input node device 101 is an end-point. As already mentioned, the input node device 101 may receive more than one link recovery message for each link recovery.

In a following step S602, the input node device 101 unmarks, in the local forwarding table(s), the data paths restored by the link recovery. In other words, the input node device 101 indicates, for each data path restored by the link recovery, that said data path is restored. Considering the forwarding table shown in FIG. 1B, the input node device 101 sets, for each data path restored by the link recovery, the flag in the fourth column 154 to TRUE.

In a following step S603, the input node device 101 checks whether the restored data path has to replace an alternative data path that was selected following the link failure, or another currently activated data path. This may be done according to a predefined criteria, such as a load balancing criteria. When the restored data path has to replace an alternative data path, the input node device 101 selects the data path identified in the link recovery message to replace the alternative data path that was selected following the link failure. The input node device 101 then switches from the previous active data path to the restored data path. The input node device 101, or more generally the end-point receiving the link failure message, maintains information identifying each activated data path.

In a following step S604, the input node device 101 generates a path switch message. The path switch message includes an identifier of the other end-point of the data path to be activated and an identifier of the data path to be activated. Then, the input node device 101 transmits the generated path switch message via the restored data path. The output port of the input node device 101 via which the path switch message has to be transmitted can be retrieved from the local forwarding table, as already described.

The path switch message may further include an identifier of the data path to be deactivated, the concerned end-point being the same as for the data path to be activated. This is practically useful when more than one data path may be used in parallel from the input node device 101 to the other end-point of said data paths.

FIG. 7 schematically represents an algorithm, performed by each node device and each terminal device of the mesh communications network, when receiving a path switch message. Let's consider that the algorithm is executed by the node device 111.

In a step S701, the node device 111 receives a path switch message. The path switch message includes an identifier of an end-point of the data path to be activated and an identifier of the data path to be activated. The path switch message may further include an identifier of the data path to be deactivated.

In a following step S702, the node device 111 checks whether said node device 111 is the end-point concerned by the path switch message, i.e. whether said node device 111 is the data path end-point identified in the path switch message. When the node device 111 is the end-point concerned by the path switch message, a step S703 is performed; otherwise, a step S704 is performed.

In the step S703, the node device 111 activates the data path identified as to be activated in the received path switch message. Either a data path to be deactivated is indicated in the received path switch message, or the node device 111 is able to deduce which data path needs to be deactivated from the current situation. When the data path to be deactivated is indicated in the received path switch message, the node device 111 deactivates said data path. When the data path to be deactivated is not indicated in the received path switch message, only one data path is supposed to be activated from one end-point to another end-point; therefore, the node device 111 is able to determine which data path has to be deactivated, as said data path is the one that is activated so far with the concerned end-point.

The node device 111, or the terminal device receiving the path switch message, maintains information identifying each activated data path.

In the step S704, the node device 111 forwards the received path switch message via the data path to be activated that is identified in the received path switch message.

The invention claimed is:

1. A method for configuring node devices of a mesh communications network, the node devices being interconnected by links, forwarding tables being implemented by said node devices wherein each node device performs, upon detecting a link failure of a link previously connected to a port of said node device or a link recovery of a link connected to a port of said node device:
   determining, from a local forwarding table, one or more data paths impacted by the link failure or restored by the link recovery; and
   transmitting toward one end-point of each determined data path at least one message representative of said link failure or said link recovery and including identifiers of said determined paths;
   wherein each end-point, when receiving said at least one message representative of said link failure or said link recovery, records an indication of whether each data path identified in the received message can be activated or not;
   wherein, when the received message is representative of a link failure, each end-point performs:
      selecting an alternative data path for each data path identified in said received message, and
      transmitting, for each selected alternative data path, a path switch message toward the other end-point of said selected alternative data path, aiming at activating said alternative data path instead of the corresponding data path impacted by the link failure,
   wherein the forwarding tables implemented by said node devices are initially built following a link-state routing protocol, and wherein each node device further performs, upon detecting a link failure of a link previously connected to a port of said node device or a link recovery of a link connected to a port of said node device:
      indicating, in the local forwarding table, that said determined paths cannot be activated, in case of link failure; and
      indicating, in the local forwarding table, that said determined paths can be activated, in case of link recovery; and
   wherein the mesh communications network enables devices located in a train to communicate, wherein at least some node devices are located in the train, and wherein the link-state protocol is applied by the node devices when there is a train configuration change.

2. The method according to claim 1, wherein each forwarding table consists of a correspondence between:
   a data path identifier;
   an identifier of an end-point of said data path;
   an identifier of an output port of the node device implementing said forwarding table, via which the identified end-point of said data path is reachable; and
   a flag indicating whether the identified path can be activated.

3. The method according to claim 1, wherein each node device performs, upon detecting the link failure or the link recovery:
   determining via which port of said node device the link that failed was connected or the link that recovered is connected;
   indicating, in the message representative of the link failure or of the link recovery, an identifier of a data path via which the message representative of the link failure or the link recovery has to be propagated; and
   transmitting the message representative of the link failure or of the link recovery via all ports of said node device but the determined port via which the link that failed was connected or the link that recovered is connected; and
   wherein, when receiving the message representative of the link failure or of the link recovery, each node device performs:
      checking whether the data path via which the message representative of the link failure or of the link recovery has to be propagated is present in a local forwarding table;
      transmitting the message representative of the link failure or of the link recovery via all ports of said node device but the port from which said message has been received, when said data path is present in a local forwarding table; and
      discarding the message representative of the link failure or of the link recovery, when said data path is not present in a local forwarding table.

4. The method according to claim 1, wherein, when receiving the path switch message, each device of the mesh communications network maintains information indicating which data path, for which said device is an end-point, is activated.

5. The method according to claim 1, wherein, once each forwarding table is built following the link-state routing protocol, each node device performs:
   providing to at least one neighbour node device the content of each forwarding table implemented by said node device and related to the port of said node device via which said neighbour node device is connected to said node device;
   obtaining from each neighbour node device the content of each forwarding table implemented by said neighbour node device and related to the port of said neighbour node device via which said node device is connected to said neighbour node device; and
   building at least one reverse path table from said content obtained from each neighbour node.

6. The method according to claim 5, wherein, when generating the message representative of the link failure or the link recovery, each node device determines the end-point to which said message has to be transmitted using said reverse path table.

7. The method according to claim 1, wherein the mesh communications network comprises an input node device, wherein all data paths defined in each forwarding table have said input node device as end-point, and wherein, when generating the message representative of the link failure or of the link recovery, each node device transmits the message representative of the link failure or of the link recovery to said input node device.

8. The method according to claim 1, wherein the mesh communications network is of Ethernet type and wherein the link-state routing protocol is the Shortest Path Bridging SPB protocol.

9. A non-transitory computer readable medium, having stored thereon program code instructions which can be loaded in a programmable device for implementing the method according to claim 1, when the program code instructions are run by the programmable device.

10. A system comprising:
- a plurality of node devices; and
- a plurality of links interconnecting the plurality of node device into a mesh communications network,
- wherein each of the plurality of node devices includes:
  - a local memory having stored thereon a forwarding table, and
  - processing circuitry configured to:
    - upon detecting a link failure of a link previously connected to a port of said node device or a link recovery of a link connected to a port of said node device
      - determine, from a local forwarding table, one or more data paths impacted by the link failure or restored by the link recovery; and
      - transmit toward one end-point of each determined data path at least one message representative of said link failure or said link recovery and including identifiers of said determined paths; and
    - upon receipt of a message representative of said link failure or said link recovery, circuitry to records an indication of whether each data path identified in the received message can be activated or not;
  - wherein, when the received message is representative of a link failure, said processing circuitry is further configured to:
    - select an alternative data path for each data path identified in said received message, and
    - transmit, for each selected alternative data path, a path switch message toward the other end-point of said selected alternative data path, aiming at activating said alternative data path instead of the corresponding data path impacted by the link failure;
  - wherein the forwarding tables stored in said node devices are initially built following a link-state routing protocol, and wherein upon detecting a link failure of a link previously connected to a port of said node device or a link recovery of a link connected to a port of said node device, said processing circuitry is further configured to:
    - indicate, in the local forwarding table, that said determined paths cannot be activated, in case of link failure; and
    - indicate, in the local forwarding table, that said determined paths can be activated, in case of link recovery, and
  - wherein the mesh communications network enables devices located in a train to communicate, wherein at least some node devices are located in the train, and wherein the link-state protocol is applied by the node devices when there is a train configuration change.

* * * * *